UNITED STATES PATENT OFFICE.

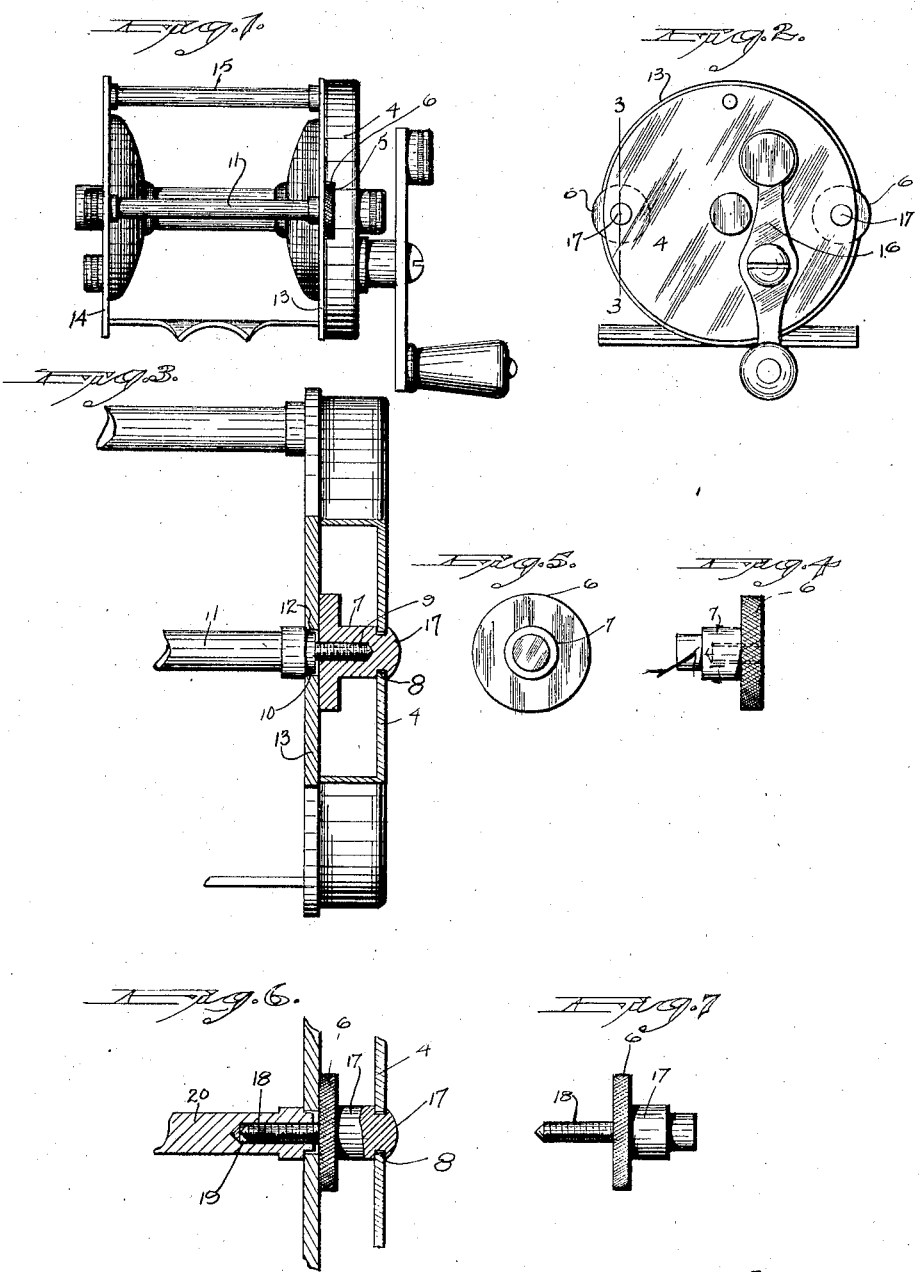

JOHN D. ROBERTSON, OF NEW HAVEN, CONNECTICUT, ASSIGNOR TO WINCHESTER REPEATING ARMS CO., A CORPORATION.

FISHING-REEL.

1,355,695.   Specification of Letters Patent.   Patented Oct. 12, 1920.

Application filed February 16, 1920. Serial No. 359,020.

*To all whom it may concern:*

Be it known that I, JOHN D. ROBERTSON, a citizen of the United States, residing at New Haven, in the county of New Haven and State of Connecticut, have invented a new and useful Improvement in Fishing-Reels; and I do hereby declare the following, when taken in connection with the accompanying drawings and the characters of reference marked thereon, to be a full, clear, and exact description of the same, and which said drawings constitute part of this application.

My invention relates to an improvement in that class of fishing-reels constructed to be taken apart and re-assembled for cleaning by the fingers without the use of tools of any description, the object being to produce a simple, cheap, and convenient reel of the type described.

With these ends in view, my invention consists in a fishing-reel having certain details of construction and combinations of parts as will be herinafter described and pointed out in the claims.

Figure 1. A view in rear elevation of a fishing-reel constructed in accordance with my invention.

Fig. 2. A view of the handle end thereof.

Fig. 3. An enlarged broken detail view on the line 3—3 of Fig. 2.

Fig. 4. A detached view in side elevation of one of the mounting-nuts swiveled in the removable head thereof.

Fig. 5. A similar reverse view thereof.

Fig. 6. A broken detail sectional view of a modified form of my invention.

Fig. 7. A detached view of the swiveled cap-fastening member thereof.

In carrying out my invention, as shown in Figs. 1 to 5 inclusive, the gear-cap or gear-housing 4 of the reel is formed at opposite points in the edge of its rim with slots 5 for the outward projection through them of the outer edges of the knurled flanges 6 of cap-fastening members in the form of pillar-nuts 7 permanently swiveled in perforations 8 in the face of the cap, near the edges thereof. The said nuts 7 are tapped and threaded through their flanges 6 and thus adapted to be screwed upon screws 9 projecting from shoulders 10 upon the outer ends of two oppositely located pillars 11 of the reel, these pillars being fixed pillars. The shoulders 10 of the pillars 11 have bearing in perforations 12 in the right-hand end-plate 13 of the reel, which also has a corresponding left-hand end-plate 14, the said end-plates being spaced apart by pillars 15 as well as by the pillars 11. The cap 4 carries the usual balanced handle 16 and other accessories having no connection with my present invention.

For the removal of the cap 4 from the reel, it is only necessary to unscrew the nuts 7 by engaging the tips of the fingers with those portions of the flanges 6 thereof which project through the slots 5 in the rim of the cap. The gearing thus exposed having been cleaned, the cap is replaced in the same manner. As shown, the nuts are swiveled in the cap by heading their reduced outer ends down upon the same, as at 17, but the nuts may be permanently swiveled in the cap in any other convenient manner.

In the modified construction shown by Figs. 6 and 7 of the drawings, the construction shown by Figs. 1 to 5 inclusive, is reversed in so far as the cap-fastening member 17 permanently swiveled in the gear-cap 4, is formed with a screw 18 entering a tapped hole 19 in the fixed pillar 20, the operation and function remaining the same as above described for the other form of my invention.

I claim:

1. In a fishing-reel, the combination with a fixed pillar thereof, of a gear-cap, and a cap-fastening member permanently swiveled in the said cap and having screw-connection with the said pillar for removably securing the said cap thereto.

2. In a fishing-reel, the combination with the right-hand end-plate thereof, of a fixed pillar having a screw projecting through the said plate, a gear-cap, and a cap-fastening member permanently swiveled in the said cap and adapted to be engaged with the said projecting screw and removably securing the cap in place.

3. In a fishing-reel, the combination with a fixed pillar thereof, of a gear-cap having a slot formed in its rim, and a flanged cap-fastening member pivotally swiveled in the said cap and having screw-connection with the said pillar for removably securing the cap thereto, the flange of the said member projecting through the slot in the edge of the cap for engagement and operation by the finger of the hand of the user.

4. In a fishing-reel, the combination with a fixed pillar, of a gear-cap having a slot in the edge of its rim, and a flanged cap-fastening nut permanently swiveled by its outer end in the said cap, and having screw-connection with the said pillar for removably securing the cap thereto, and the said flange of the nut being adapted to project through the said slot for engagement with and operation by the hand of the user.

In testimony whereof, I have signed this specification in the presence of two subscribing witnesses.

JOHN D. ROBERTSON.

Witnesses:
DANIEL H. VEADER,
ERIK S. PALMER.